(12) United States Patent
Uniacke

(10) Patent No.: US 6,564,258 B1
(45) Date of Patent: May 13, 2003

(54) DETECTION OF NETWORK TOPOLOGY CHANGES AFFECTING TRAIL ROUTING CONSISTENCY

(75) Inventor: Mark Uniacke, Hertfordshire (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/193,094

(22) Filed: Nov. 16, 1998

(30) Foreign Application Priority Data

Sep. 30, 1998 (GB) .............................................. 9821150

(51) Int. Cl.[7] .......................................... G06F 15/173
(52) U.S. Cl. ....................... 709/223; 709/201; 709/202; 709/203; 709/220; 709/223; 709/224; 370/14; 710/220; 707/10
(58) Field of Search ................................. 709/201–203, 709/220–224; 710/220; 707/10; 370/14

(56) References Cited

U.S. PATENT DOCUMENTS

| | | | | |
|---|---|---|---|---|
| 5,384,768 A | * | 1/1995 | Fujii ........................... 370/14 |
| 5,548,726 A | * | 8/1996 | Pettus ......................... 709/221 |
| 5,956,719 A | * | 9/1999 | Kudo et al. ................... 707/10 |
| 5,987,497 A | * | 11/1999 | Allgeier ...................... 709/201 |
| 6,105,100 A | * | 8/2000 | Dean et al. ................... 710/220 |
| 6,161,125 A | * | 12/2000 | Traversat et al. ........... 709/203 |
| 6,195,694 B1 | * | 2/2001 | Chen et al. .................. 709/220 |
| 6,223,219 B1 | * | 4/2001 | Uniacke et al. ............. 709/223 |
| 6,308,208 B1 | * | 10/2001 | Jung et al. ................... 709/224 |

* cited by examiner

*Primary Examiner*—Ayaz Sheikh
*Assistant Examiner*—Thu Ha Nguyen
(74) *Attorney, Agent, or Firm*—Lee, Mann, Smith, McWilliams, Sweeney & Ohlson

(57) ABSTRACT

There is disclosed a method and apparatus for detection of client trails which may become unsupported due to reconfiguration of node elements within a network at a server layer, and a rerouting apparatus and method for proposing a set of alternative routes to support client trails during reconfiguration of a network at a physical layer. Data describing each trail, connection, node, link and other physical resource is maintained in a managed object database on a network controller. A trail detection algorithm investigates trail termination points corresponding to proposed deleted or created trails to see if those termination points support client trails at higher layers. If supported client trails are detected at higher layers, a routing algorithm is applied to find a set of alternative routes over which the client layer trails may be rerouted during network configuration at the physical or server layer.

31 Claims, 14 Drawing Sheets

DETECTION OF NETWORK TOPOLOGY CHANGES AFFECTING TRAIL ROUTING CONSISTENCY

FIELD OF THE INVENTION

The present invention relates to network management in communications networks, and particularly although not exclusively to the detection of server layer re-configurations which affect client layers in a communications network operating a layered transmission protocol structure.

BACKGROUND TO THE INVENTION

In prior art synchronous communications networks, for example of the synchronous digital hierarchy (SDH) type, incorporating synchronous optical network (SONET) options in accordance with ITU-T recommendation G.707, comprising a plurality of node equipment, communicating over a plurality of links, eg fiber optic links, reconfiguration of a network following physical modification to the network, for example addition or deletion of a node equipment, is carried out using a network management system comprising one or more graphical user interfaces, operated by one or more human network operators. In prior art network management systems, a network operator is presented with a visual display screen on a graphical user interface, displaying a plurality of icons representing node elements, links, connections and trails between node elements. Upon physical reconfiguration of part of a network, eg by reconnection of existing node elements in a different manner, or by addition or deletion of a node element, logical reconfiguration of the network including reconfiguration of routes, trails, connections is made by manual input of commands by a human network operator at the graphical user interface. For example, on adding a new node to an existing synchronous network, a network operator may visually inspect a two dimensional graphical visual representation of a section of a network on a visual display device, and by inspection of the visual display take a decision on how to re-route a trail or path in a synchronous network through a new node. Where the trail or path extends over a large number of nodes of the network, some of those nodes may be under control of a second network operator operating from a remote position. Under these circumstances, the two operators need to communicate with each other, eg by telephone, to discuss changes to the network, before implementing those changes by typing in keystroke commands at the respective graphical user interfaces of their network management systems.

However, prior art communications networks are highly complex in nature, typically operating a plurality of protocol layers comprising several server layers, eg physical layers and optical layers, and client layers, comprising service layers and the like. Changes to the server layers, such as physical replacement or reconfiguration of the node equipment or logical reconfiguration of one or more nodes at the server layers have consequences for reconfiguration of all client layers supported by those server layers. Thus, although the network operators are presented with a visual display at which visual representations of various client and server layers may be presented, due to the inherent size and complexity of communications networks, the impact of changes at the server layers may not be fully realized by human network operators, and reconfiguration of client layers upon changes to server layer functionality implemented by means of visual inspection by one or more network operators and manual entering of commands into a graphical user interface may not provide the optimum reconfiguration of a network. Although it may be possible to find reconfiguration solutions by visual inspection, a total range of possible reconfigurations is greater than a human operator can investigate. In order for the human network operator to produce any reconfiguration solution at all, this may entail a downtime on the corresponding part of the network from the order of around 10 minutes to days depending upon the complexity of connections to a node.

Further, prior art reconfigurations of synchronous networks operate only by using aggregates, and so re-routing solutions are found only when aggregates are de-multiplexed into tributaries.

SUMMARY OF THE INVENTION

One object of the present invention is to optimize the reconfiguration of a communications network at a set of clients layers, following a reconfiguration of the network at a server layer.

Another object of the present invention is to provide an automated network management tool for finding a plurality of possible reconfigurations of a communications network at a set of client layers, in consequence of a change or proposed change to a network at one or more server layers of the network.

A further object of the present invention is to enable a quicker time to reconfiguration of a network after changes to a network topology, either physical or logical.

Another object of the present invention is to find re-routing solutions in a network which are non-obvious to a human operator, or which would be practically impossible for a human operator to find.

According to a first aspect of the present invention there is provided a method of detecting an effect of a network topology change in a network comprising a plurality of resources arranged in a plurality of layers wherein resources at a client layer are dependent upon resources at a server layer, said method comprising the steps of: maintaining an object database describing a plurality of resources of said communications network, said object database comprising a plurality of instances representing physical and logical resources; modifying individual ones of said plurality of instances when a said resource is re-configured by setting a state of a said instance; and detecting at least one client layer resource affected by a change to a said server layer resource.

Said plurality of instances may include instances selected from the set: an instance representing a node entity; an instance representing an endpoint; an instance representing a trail; an instance representing a trail termination point; an instance representing a connection; an instance representing a connection termination point; an instance representing a link connection; an instance representing a port; an instance representing a sub network connection; an instance representing a link; an instance representing a link termination point.

Said method may comprise the steps of: receiving a signal for deletion of a trail; and in response to said received signal, reading said object database to determine whether a trail subject of said delete signal supports a client trail.

Said method may comprises the steps of: receiving a signal for deletion of a trail; on receipt of said delete signal determining whether a trail subject of said signal is supporting a client trail; and if said trail subject of said delete signal is supporting a client trail, setting a data describing said trail to a state signifying said trail is supporting at least one client trail.

The method may further comprise the step of setting data describing a said client trail to a state signifying deletion of said trail is inconsistent with supporting said client trail.

According to a second aspect of the present invention there is provided a method of re-routing a trail in a synchronous communications network, said method comprising the steps of: receiving a signal for creation of a new trail; for each of a pair of endpoints, identifying data describing said endpoint; determining whether said endpoint data is in a state signifying that said endpoint is capable of supporting said new trail and; if said endpoint data of each said endpoint is in a state signifying that said new trail can be created, creating said new trail.

According to a third aspect of the present invention there is provided a method of re-routing a client trail supported by a server trail, in a synchronous communications network, said method comprising the steps of: receiving a signal denoting that a new trail is to be created; identifying data describing at least one endpoint of said t rail to be created; determining from said endpoint data whether creation of said trail conflicts with another already created trail; and if said new trail to be created is in conflict with an already created trail, determining whether said already created trail is suitable for deletion.

Said method may further comprise the steps of, if said already created trail is in a state suitable for deletion, applying a search algorithm to search for an alternative route for routing said al ready created trail.

Said step of searching for an alternative route for said already created trail may comprise the steps of: assigning a cost data to each of a plurality of network resources; and determining an optimum route on the basis of said cost data.

For example, a said cost data may be assigned on the basis of an availability of a said network resource. A said cost data may be assigned on the basis of a least number of hops between node entities.

According to a fourth aspect of the present invention there is provided a method of managing a communications network comprising a plurality of network resources, said method comprising the steps of: representing each of a plurality of said network resources by managed object data in a managed object database; inputting signals describing deletion of a said resource at a server layer; interrogating said set of managed object data to find a set of client resources dependent on said server resource.

Said data describing said resources may comprise connection rule data describing a plurality of rules for connecting said plurality of resources.

Said plurality of network resources may include resources selected from the set: transmission entities; physical resources; logical resources.

Preferably said managed object data describes at least one element selected from the following set: trail termination point; connection termination point; connection; link; link connection; physical port; logical port; sub network connection; server trail; client trail; server link; client link.

The invention includes a network management apparatus for a communications systems comprising a plurality of nodes, said network management apparatus comprising: at least one data processor; at least one data storage means; wherein said processor and said data storage means are configured as a managed object database comprising a plurality of managed object data representing a plurality of resources of said communications network; and a said processor operates in accordance with an algorithm to detect changes to a configuration of said plurality of resources.

Preferably a said processor operates in accordance with an algorithm to find a plurality of routes across said network in response to a detected change of configuration of said plurality of resources.

Preferably a said processor operating in accordance with said detection algorithm operates to read a plurality of states of said managed objects of said managed object database.

A said topology change may comprise a physical topology change and/or a logical topology change. Topological changes may be made at a server layer of said network and said step of determining which of a plurality of nodes are affected comprises determining which of a set of client layer trails are affected.

Specific implementations of the present invention may provide an automated system capable of detecting when topology changes are made in a network and how those changes affect existing trail routings by changing a state of a data representation of components of a trail, eg endpoints, and data representing the trail itself to states denoting that a trail is in conflict with other trails (that is to say uses common end points or ports with other trails), and whether the trail supports other client trails at client layers.

Further, specific embodiments and implementations may be capable of detecting alternative routes for trails which may allow inconsistent trails in a "deleted supporting" state to be re-routed. This may occur every time a topology change is made to a network and implementations may be capable of detecting a plurality of individual topological changes which occur independently throughout the network, and applying re-routing functionality for each individual occurrence of a topological change of the network. Specific implementations of the present invention may allow improved scalability of existing networks with minimum network management effort.

The invention is applicable generally, and particularly although not exclusively in the fields of synchronous digital hierarchy (SDH), synchronous optical network (SONET), asynchronous transfer mode (ATM), internet protocol, and frame relay.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

Figure 1:
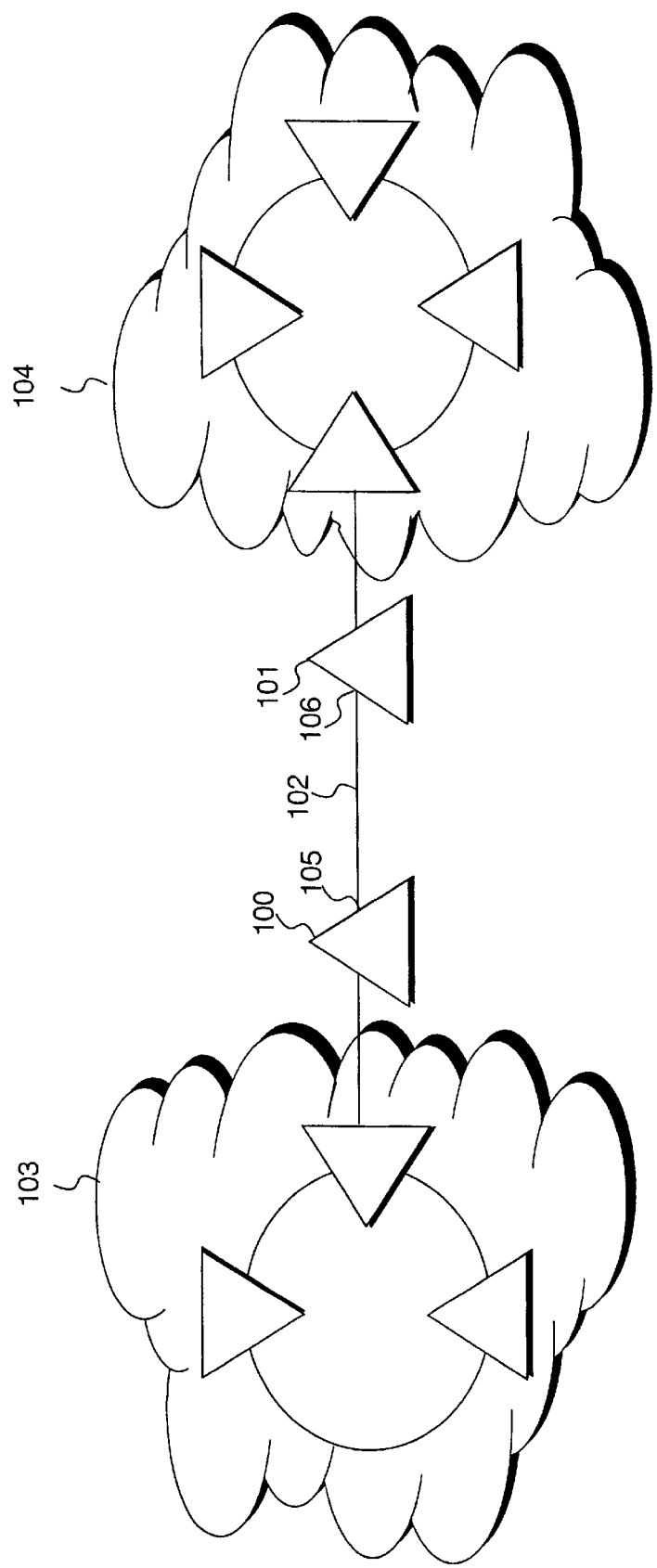
FIG. 1 illustrates schematically a generic communications network comprising a plurality of nodes and links.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In the applicant's previous disclosure U.S. Ser. No. 09/010,387 filed at the U.S. Patent Office on Jan. 20, 1998 and entitled "Capability Modeling Using Templates In Network Management System", the contents of which are incorporated herein, there was disclosed a method and apparatus for automatically updating a management system database with data describing a configuration and status of a plurality of network elements in a synchronous communications network. Upon configuration of node equipment, signals describing the changes to the node equipment are automatically transmitted over an operation and maintenance (OAM) channel to a management system comprising a managed object base containing data describing physical and logical resources of node elements, and connectivity capabilities of node elements.

In the applicant's co-pending patent application U.S. Ser. No. 09/014,742 entitled "State Machine for Trail Management System" filed at the U.S. Patent Office on Jan. 28, 1998, the contents of which are incorporated herein, there is disclosed a state machine based on a managed object base in a network management system for recording a plurality of states of trails and paths within a synchronous network. Such states may include a "deleted supporting" state in which a trail may be designated for deletion once any further client trails or connections which the trail is supporting at a client layer have become either unnecessary or have been transferred to a different server trail.

The specific implementation presented herein interfaces with a managed object base and state machine as described in the aforementioned U.S. patent applications.

There will now be described methods and structures of a specific implementation according to the present invention, including a description of its modes of operation.

In this specification the following terms are defined in accordance with ITU-T recommendation G.805 as follows:

The term "link" is defined as a "topological component" which describes a fixed relationship between a "sub-network" or "access group" and another "sub-network" or "access group". A link consists of a subset of ports at the edge of one sub-network or access group which are associated with a corresponding sub-set of ports at the edge of another sub-network or access group. A link represents a topological relationship and available transport capacity between a pair of sub-networks or between a sub-network and an access group or pair of access groups. Multiple links may exist between any given sub-network and access group or pair of sub-networks or access groups. Links are established or maintained by a server layer network.

A "link connection" is defined as a "transport entity" that transfers information between "ports" across a link. A link connection is capable of transferring information transparently across a link. A link connection is delimited by ports and represents a fixed relationship between the ends of a link. A link connection represents a pair of adaptation functions and a trail in a server layer network.

A "uni-directional port" is defined as representing the output of a trail termination source or uni-directional link connection, or the input to a trail termination sink or unidirectional link connection.

A "port" is defined as consisting of a pair of uni-directional ports.

The term "sub-network connection" is defined as a "transport entity" which transfers information across a sub-network and is formed by the association of "ports" on the boundary of the sub-network.

The term "unidirectional trail" is defined as a "transport entity" responsible for the transfer of information from the input of a trail termination source to the output of a trail termination sink.

The term "trail" is defined as a "transport entity" which consists of an associated pair of uni-directional trails capable of simultaneously transferring information in opposite directions between their respective inputs and outputs.

The term "un-idirectional connection" is defined as a "transport entity" which transfers information transparently from input to output.

The term "connection" is defined as a "transport entity" which consists of an associated pair of "uni-directional connections" capable of simultaneously transferring information in opposite directions between their respective inputs and outputs.

The term "endpoint" refers to any termination point terminating a trail, a route, a link or a connection.

Referring to FIG. 1 herein, there is illustrated a portion of a synchronous digital network comprising a plurality of nodes and links between nodes. First and second nodes 100, 101 are connected by a first link 102, first node 100 communicating with a first plurality of nodes and links 103, and second node element 101 communicating with a second plurality of nodes and links 104. In the example of FIG. 1, the first plurality of nodes and links comprises three nodes and the second plurality of nodes and links comprises four nodes, however in principle the number of interconnected nodes and links in a network are unbounded, and are typically of the order of up to 1000. Link 102 comprises a physical link between first and second nodes 100, 101. Link 102 is connected to first node 100 at a first link termination point 105, and is connected to second node 101 at a second link termination point 106. Typically, link 102 carries a plurality of trails and connections at a plurality of different protocol layers between first and second nodes 100, 101 and first and second pluralities of nodes 103, 104.

A trail connects a pair of trail termination points together and comprises a path or circuit which is able to create an end to end connection between two trail termination points. A trail represents the transfer of monitored adapted characteristic information of a client layer network between access points. It is de-limited by two access points, one at each end of the trail. It represents the association between the ends of a trail. Each trail is formed by associating trail terminations with a network connection, for example a trail termination point.

Figure 2:
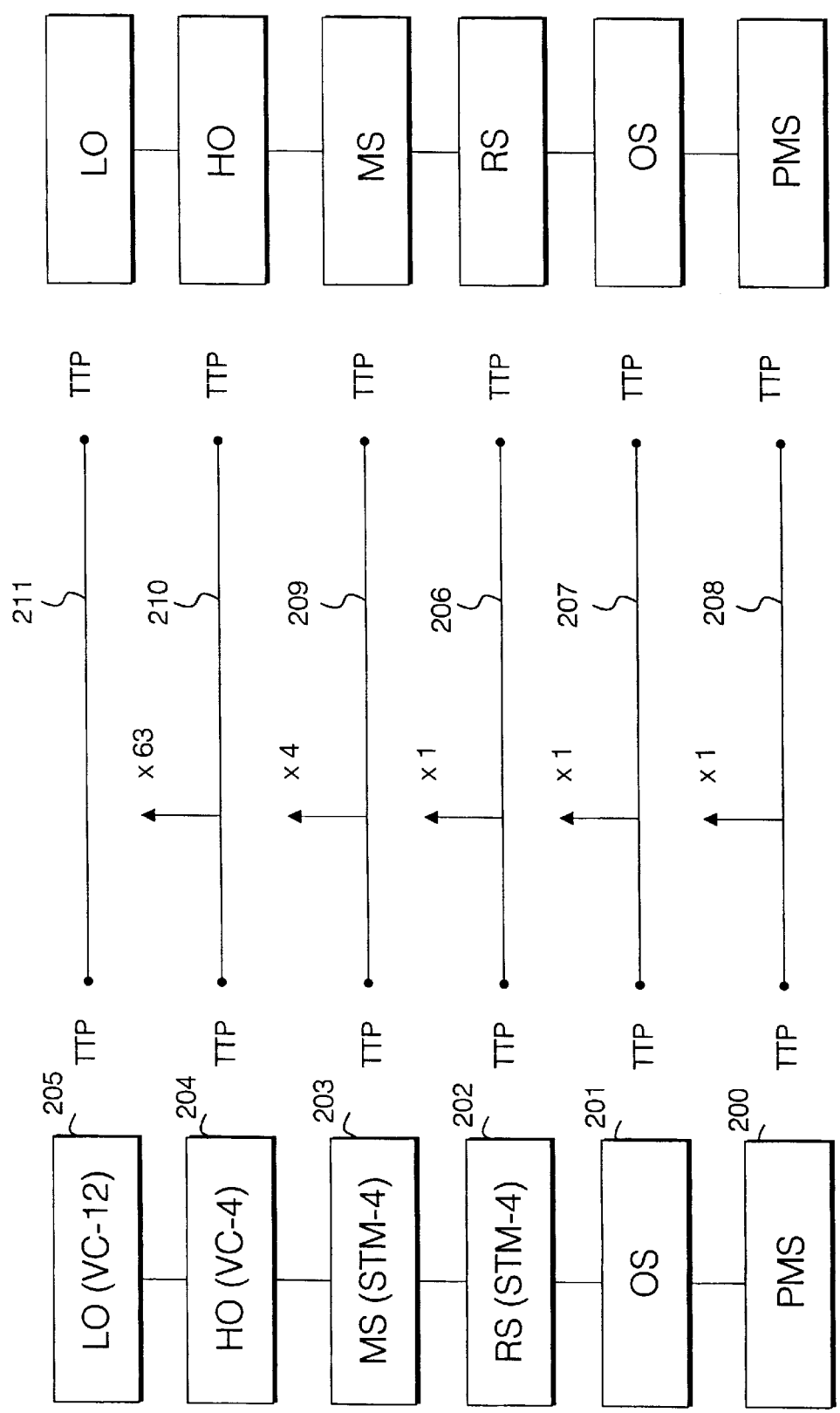
FIG. 2 illustrates schematically a layered transport model for the communications network of FIG. 1, comprising a plurality of layers wherein client layers depend on server layers for supporting client layer functionality.

Referring to FIG. 2 herein, there is illustrated schematically a generalized synchronous network layer model comprising a physical media section layer 200 representing physical resources, eg regenerators, cross connects, fiber links, node elements, multiplexers; an optical section layer 201 representing optical links; a regenerator section layer 202 representing regenerators; a multiplex section layer 203 representing multiplex channels; a higher order layer representing higher order multiplexing, for example a VC-4 virtual container layer; and a lower order layer representing a lower order of multiplex, eg a VC-12 virtual container layer. At each layer a plurality of trails exist between source and destination nodes within the network.

The plurality of layers represented in FIG. 2 herein are divided into server layers and client layers, the server layers supporting one or more client layers. For example, an STM-4 trail represented by line 206 in FIG. 2 may be a client trail for each of an optical section trail represented by line 207 and a physical media section trail represented by line 208. The regenerator section trail cannot exist without the underlying optical section trail and physical media section trail which support it. Optical section trail 206 and physical media section trail 207 are provided at server layers to regenerator section layer 202. Similarly, a regenerator section trail 206 may be supporting a multiplex section trail, eg an STM-4 trail 209. A single multiplex section trail 209 may support a plurality of higher order trails. For example, in FIG. 2 a single STM-4 multiplex section trail supports four VC-4 trails. Similarly, the lower order layer 205 is a client layer to the higher order layer 204. For example a single VC-4 trail at higher order layer 204 may support 63 VC-12 trails 211 at the lower order layer 205.

On reconfiguration of the network, for example by addition or deletion of a node element or a link at the physical layer 200, or by reconfiguration of a server trail, the physical and logical trails throughout the layer structure are affected.

Specific methods and embodiments according to the present invention operate to detect trails which are left unsupported by server layers due to changes in network topology, and to find alternative routes through alternative nodes and links over which the unsupported trails may be re-routed.

Specific implementations of the present invention are applicable for detecting both bi-directional trails, ie a trail between two trail termination points, each trail termination point having a trail termination source and a trail termination sink co-located, and additionally to a set of point to multi-point uni-directional trails, in which a plurality of trails exist between a single trail termination source and a plurality of trail termination sinks.

Figure 3:
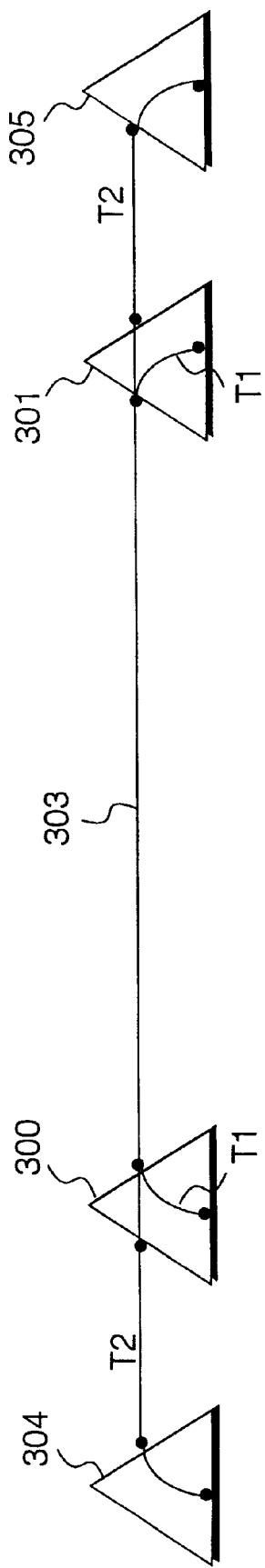
FIG. 3 illustrates schematically an example of first and second trails supported by first and second transmission entities, wherein a client trail relies on a client server trail for support.

Referring to FIG. 3 herein, there is illustrated schematically a logical representation corresponding to a pair of trails in the network example of FIG. 3. First and second trails T1, T2 respectively are client trails supported by physical link 303 between first and second transmission entities 300, 301. First trail T1 extends between first and second transmission entities 300, 301, terminating at the first and second transmission entities. Second trail T2 extends between fourth and fifth transmission entities 304, 305 respectively, passing through first and second transmission entities 300, 301.

Figure 4:
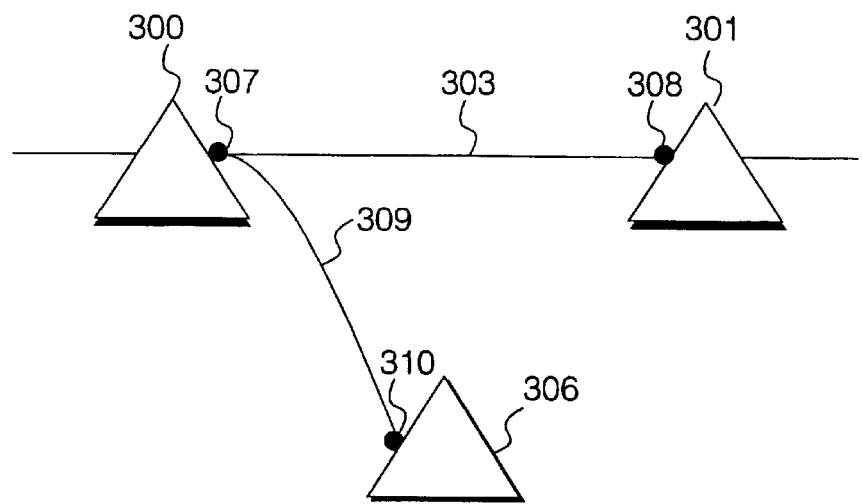
FIG. 4 illustrates schematically a simple example of a reconfiguration of the network of FIG. 1 by addition of an additional transmission entity wherein a link between a first transmission entity and the additional transmission entity requires redeployment of a port supporting a link between the first transmission entity and the second transmission entity.

Referring to FIG. 4 herein, there is illustrated schematically a first stage of a simple topological change to a layered synchronous network comprising an insertion of a third transmission entity 306 between first and second transmission entities 300, 301 connected by a link connection 303 supporting a plurality of trails at different layers in the network. Addition of third transmission entity 306 has an impact on the network at the physical layer 200 but may also have an impact at logical layers such as the regenerator section layer, multiplex section layer, higher order layer and lower order layers 202–205. Original link 303 is connected between first and second link termination points 307,308 at respective first or second physical or logical ports in the first and second transmission entities. In order to connect replacement link 309 for insertion of third node entity 306 link 303 must be disconnected from first link termination point 307, which is now used for replacement link 309 between first link termination point 307 at first node entity 300 and third link termination point 310 at a third port at third transmission entity 306.

In the simplified example of FIG. 4, replacement of first physical link 303 by second physical link 309 has implications for logical trails and connections which use physical link 303. First physical link 303 may be a high bitrate capacity link, and may carry thousands of trails between first and second transmission entities 300, 301. Specific implementations according to the present invention aim firstly to detect any client connections or trails which are affected by the disconnection of a link as exemplified in the simple example of FIG. 4, and secondly to find a set of replacement connections and trails which are available for replacement of a trail or connection affected by a topological change to the physical network.

Disconnection of physical link 303 and substitution by third link 309 connecting first transmission entity 300 and third transmission entity 306 as illustrated in FIG. 4 herein, causes the underlying supporting physical layer (ie the server layer) for logical client layer trails T1 and T2 to be reconnected to third transmission entity 306. However, because a third physical link between the second and third transmission entities is not yet connected, first and second trails T1, T2 are not supported by the underlying server layer and are disconnected.

Figure 5:
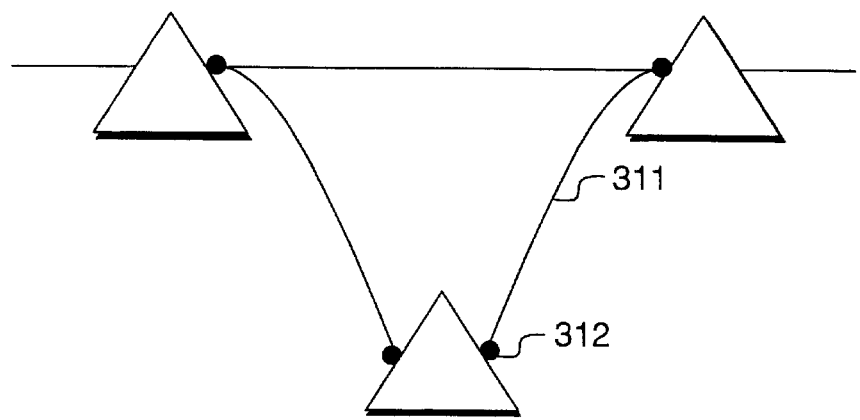
FIG. 5 illustrates schematically further connection of the additional node by a link between additional node and the second transmission entity.

Referring to FIG. 5 herein, there is illustrated a reconfiguration of the network, in which a fourth link 311 is installed between fourth connection termination point 312 of third transmission entity 306 and second connection termination point 308 of second transmission entity 301. Between third connection termination point 310 and fourth connection termination point 312 at the third transmission entity, a plurality of sub-network connections need to be created between the third and fourth connection termination points.

On completion of the fourth link 311, client trails T1 and T2 can be rerouted via third node 306, supported by server links and trails on third node 306.

Whilst the example described in FIGS. 3 to 5 herein is a simple case, in practice due to the large number of nodes and links in a typical network, the problem of identifying all trails left unsupported by network changes, and the possible alternative routes by which those trails may be re-routed is non-trivial. A network may comprise many hundreds of node equipment, each supporting thousands of individual trails and connections.

Figure 6:
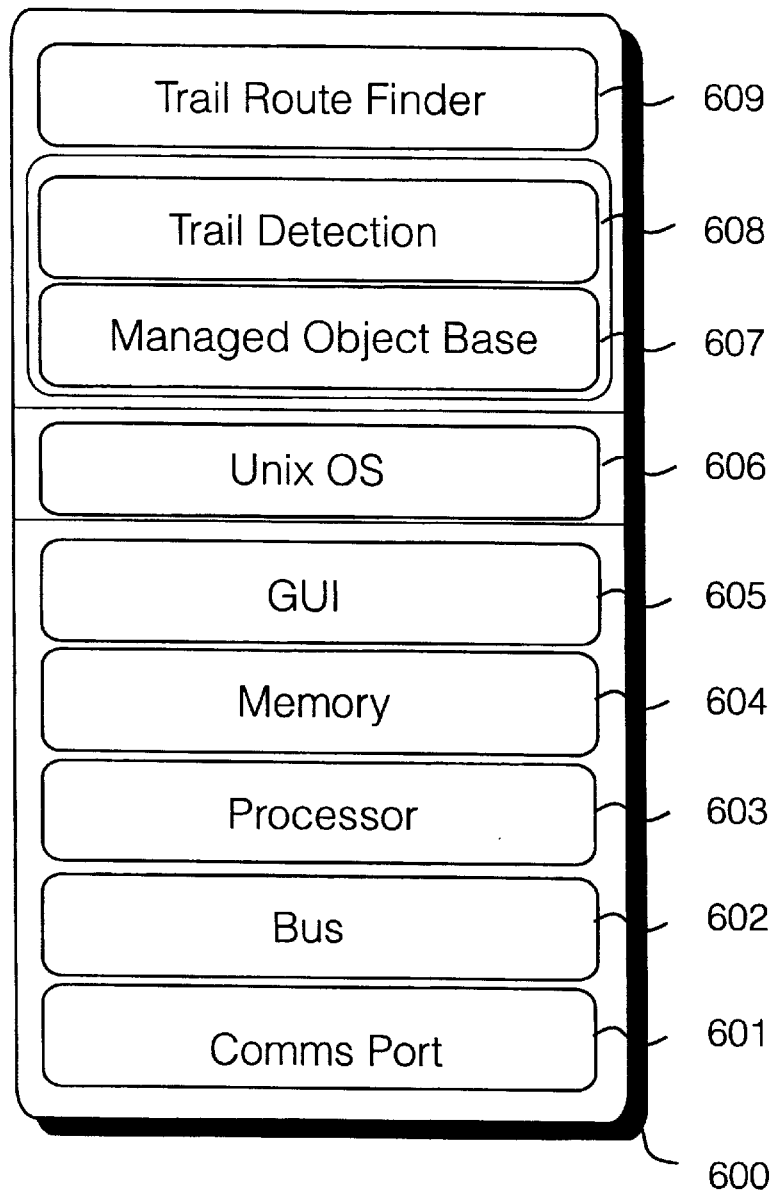
FIG. 6 illustrates schematically an architecture of a network controller capable of detecting trails affected by reconfiguration of a network.
Figure 6:
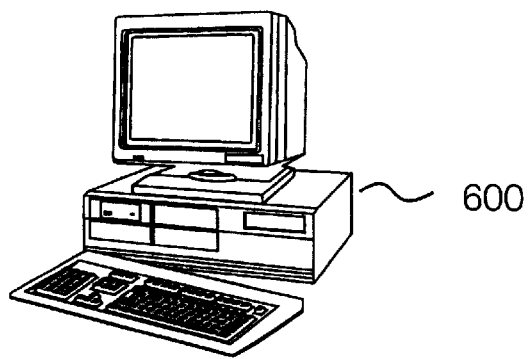

Referring to FIG. 6 herein, there is illustrated schematically an architecture of a network controller apparatus 600 for controlling a portion of a synchronous network embodying a specific implementation of the present invention. Network controller 600 comprises a communications port 601 for communicating with a network element controller over an OAM channel as described in the applicants previous disclosures referred to hereinabove; an internal bus system 602 linking separate cards of the network controller; at least one data processor 603 for providing data processing functionality; at least one data storage memory 604 for storing data relating to individual network elements and for storing applications operating on the data; an operating system 606 for example the known UNIX operating system; a managed object base 607 in which physical and logical resources of the network, eg transport entities, trails, central office switches, multiplexers, regenerators, cross connects, etc are represented as managed objects in accordance with ITU-T recommendation M.3010 (Principles for a Telecommunications Management Network) in known manner; a trail detection application 608 subject of the specific implementation of the present invention for detecting trails which are affected by network topological changes; and a trail route finder application 607, subject of the specific implementation of the present invention for finding a set of alternative routes across a network for trails which are affected by network topological changes.

Figure 7:
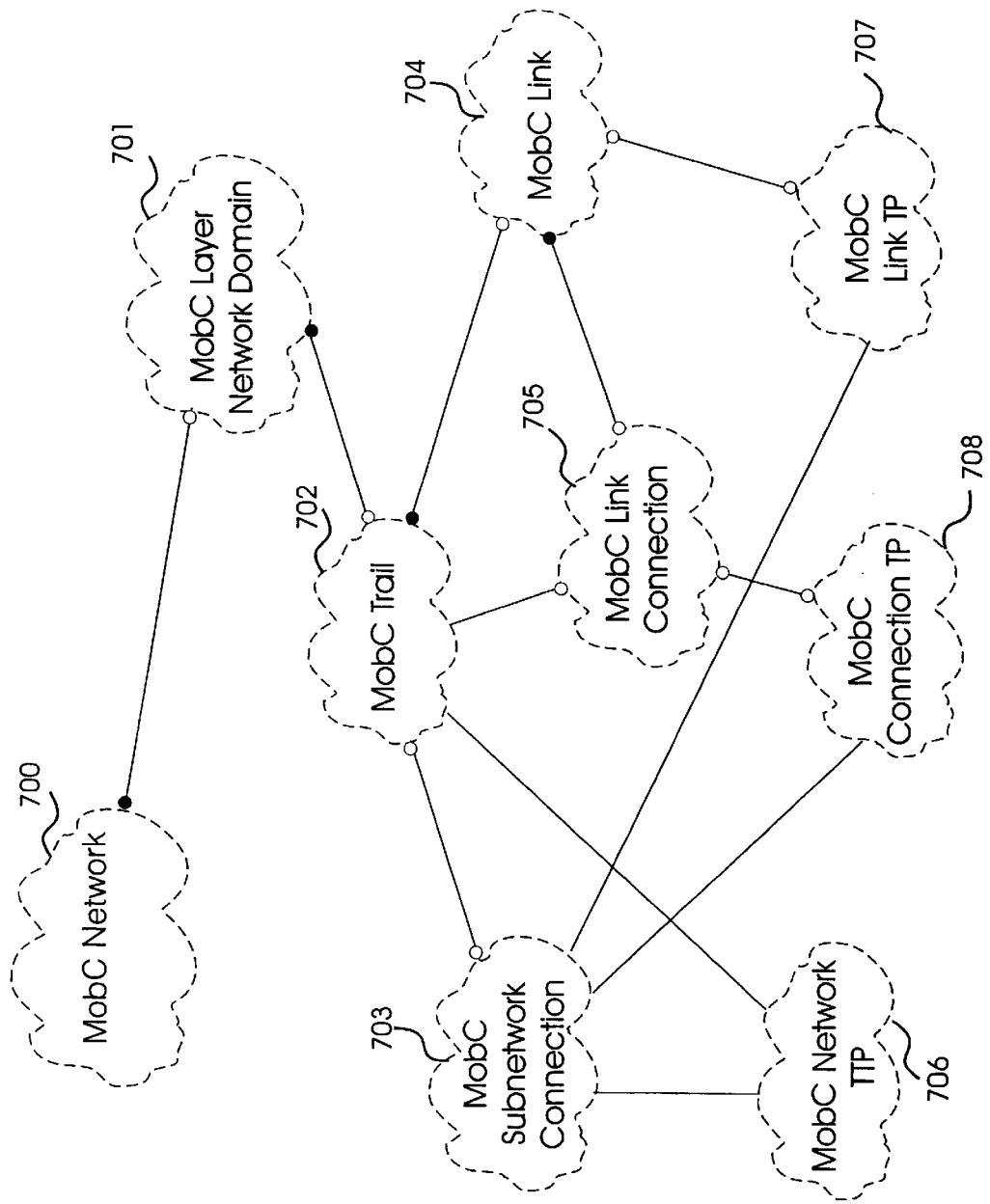
FIG. 7 illustrates schematically an entity relationship diagram describing an internal architecture of a managed object based component of the network controller of FIG. 6.

Referring to FIG. 7 herein, there is illustrated an entity relationship diagram describing relationships between a plurality of managed objects representing physical and logical entities comprising resources of a network. A whole network under-management is represented by a network object 700. The network object 700 contains: a plurality of layers, each represented by a layer network domain managed object 701 the layer network domain object describing a layer across the whole of the network under management; each layer contains a plurality of trails, each trail represented by a trail managed object 702; each trail comprising a plurality of sub-network connections represented by sub-network connection managed object 703; a plurality of links represented by a link object 704 the link objects comprising representations of server trails; a plurality of link connections each represented by a link connection object 705; each trail having a plurality of trail termination points represented by a trail termination point object 706; each link comprising a plurality of link termination points each represented by a link termination point managed object 707; and each link connection comprising a plurality of connection termination points, each represented by a connection termination point object 708. Each physical and logical component is represented by a separate instance in the object database, which is constructed according to the entity relation diagram of FIG. 7 herein.

Figure 8:
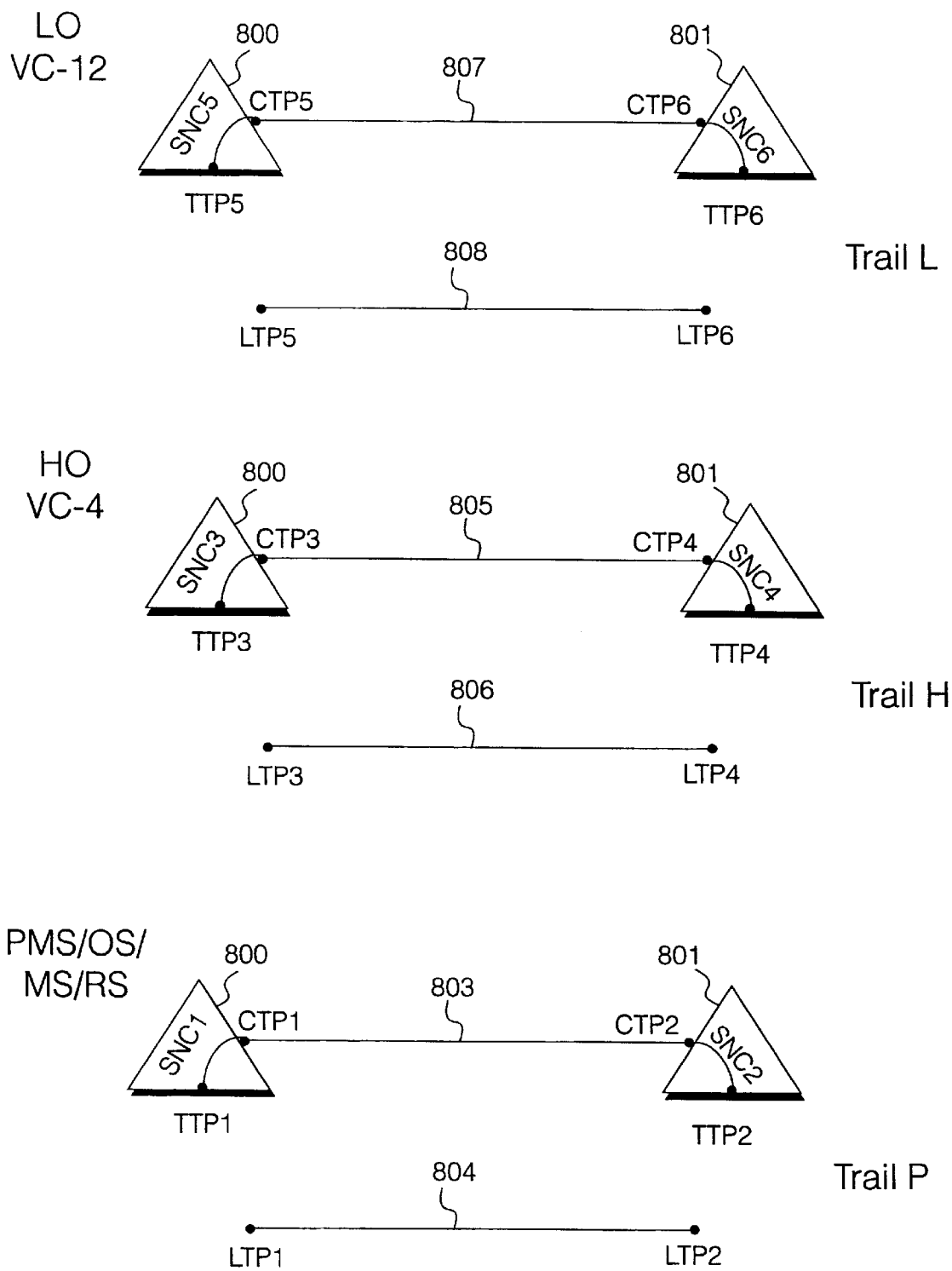
FIG. 8 illustrates schematically an example of an inter-dependency between client layer resources and server layer resources between first and second transmission entities.

Referring to FIG. 8 herein, there is illustrated schematically first and second transmission entities 800, 801 at first and second nodes illustrating a simple example of a client-server relationship between end to end trails at each of a physical layer, a higher order layer (eg a VC-4 layer) and a lower order layer (eg a VC-12 layer). Since the physical layer, optical layer, multiplex section layer, and regenerator section layer each have a one to one relationship with each other, individual trails at each of those layers are represented in FIG. 8 by a single server trail between first and second server trail termination points TTP1, TTP2. The server trail extends between first server trail termination point TTP1, across a first server sub-network connection SNC1 within first transmission entity 800 to a first server connection termination point CTP1, across first server link connection 803 supported by server link 804 to second server connection termination point CTP2, across second server sub-network connection SNC2 to second server trail termination point TTP2.

Similarly, a higher order layer client trail extends between a first higher-order client trail termination point TTP3 across first higher-order client sub network connection SNC3 to first higher-order client connection termination point CTP3, across a second link connection 805 on link 806 between third and fourth link termination points LTP3, LTP4 to second higher-order client connection termination point CTP4, across second higher-order client sub-network connection SNC4 to second higher-order client trail termination point TTP4.

Similarly, at the lower order layer (eg VC-12) a lower order client trail extends between first lower order trail termination point TTP5 across first lower order sub-network connection SNC5 to first lower order connection termination point CTP5, across lower order link connection supported by lower-order link 808 between first and second lower order link termination points LTP5, LTP6 to second lower order connection point CTP6, across second lower order sub-network connection SNC6 to second lower order trail termination point TTP6. The lower order trail is supported by and dependent upon the existence of the higher order trail, which is supported by and dependent upon the existence of the physical layer trail, which is in turn dependent upon the existence of the physical link 804.

The client/server relationship between adjacent layers is one where a link connection in a client layer network is supported by a trail in the server layer network. For example, higher-order layer link 806 is equivalent to the physical layer trail. Trail termination points in the client layer are equivalent to link termination points in the underlying server layer.

Referring to FIGS. 9 to 15 herein, there is illustrated schematically by way of example creation and deletion of trails at 3 layers between first and second node transmission entities 900, 901 and a set of process steps carried out by trail detection algorithm 608 upon insertion of a third node entity 902 through which a physical layer trail is to be re-routed. For ease of explanation, first, second and third node entities 900, 901, 902 are marked A, B, C respectively and the physical layer trail, the higher order layer trail and the lower order layer trail respectively are represented between trail termination points at node A, node B, and node C.

Figure 9:
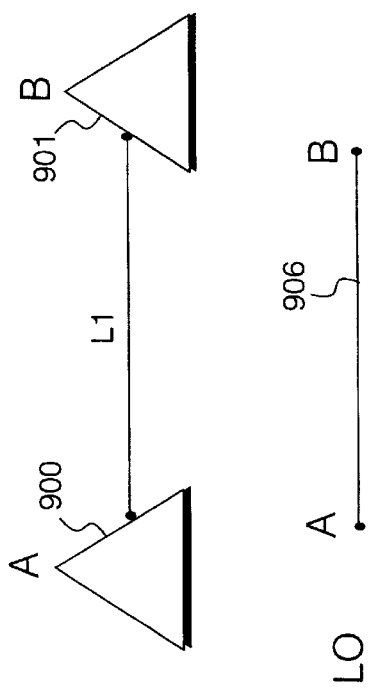
Figure 9:
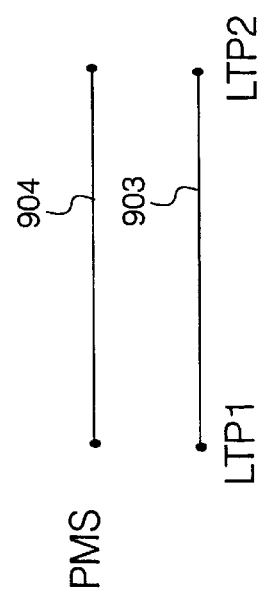

Referring to FIG. 9, physical link 903 between first and second nodes A, B supports physical media layer trail 904, higher order layer trail (eg VC-4) 905, and lower order layer trail (eg VC-12) 906.

Figure 10:
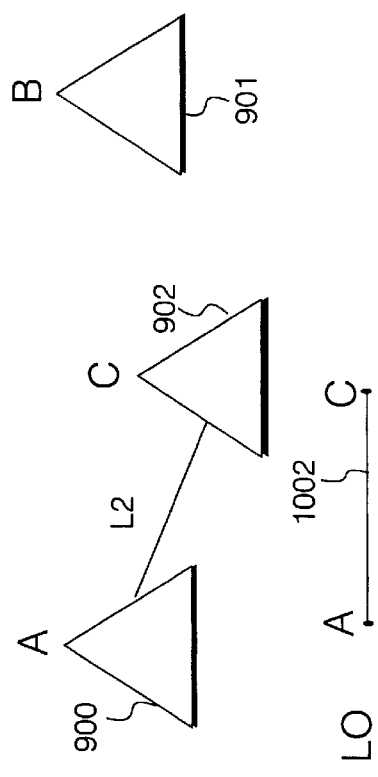
FIGS. 9 and 10 illustrate schematically examples of sub-layered trails and a client-server relationship between trails during a reconfiguration of a network.

Referring to FIG. 10, on substitution of third node entity C between first and second node entities A, B and creation of a second link L2, it is necessary to delete first link L1 because second link L2 requires use of the same port as previous link L1 which it replaces.

Deletion of first physical link L1 entails deletion of a physical trail 904 at the physical layer and creation of a new trail 1000 at the physical layer together with further new trails 1001, 1002 at the higher-order layer and the lower-order layer respectively.

For deletion of a trail, the fact that the trail has been deleted may be notified automatically to the network controller 600 through the mechanisms described in the applicant's previous disclosure U.S. Ser. No. 09/010,387 "Capability Modeling Using Templates in Network Management System", and managed object base 607 may be automatically updated to show a current status of the deleted trail according to the state machine described in the applicant's previous disclosure U.S. Ser. No. 09/014,742 "State Machine For Trail Management System" herein before referred to. Alternatively, a human network operator may enter details describing the deleted trail at the graphical user interface 605 of the network controller, in which case the status of the trail is updated in the managed object base 607 according to the state machine model of U.S. Ser. No. 09/014,742.

There will now be described how trail detection algorithm 608 modifies a state of the trail in the managed object base 607. The algorithm runs every time a change to the network topology occurs.

Figure 11:
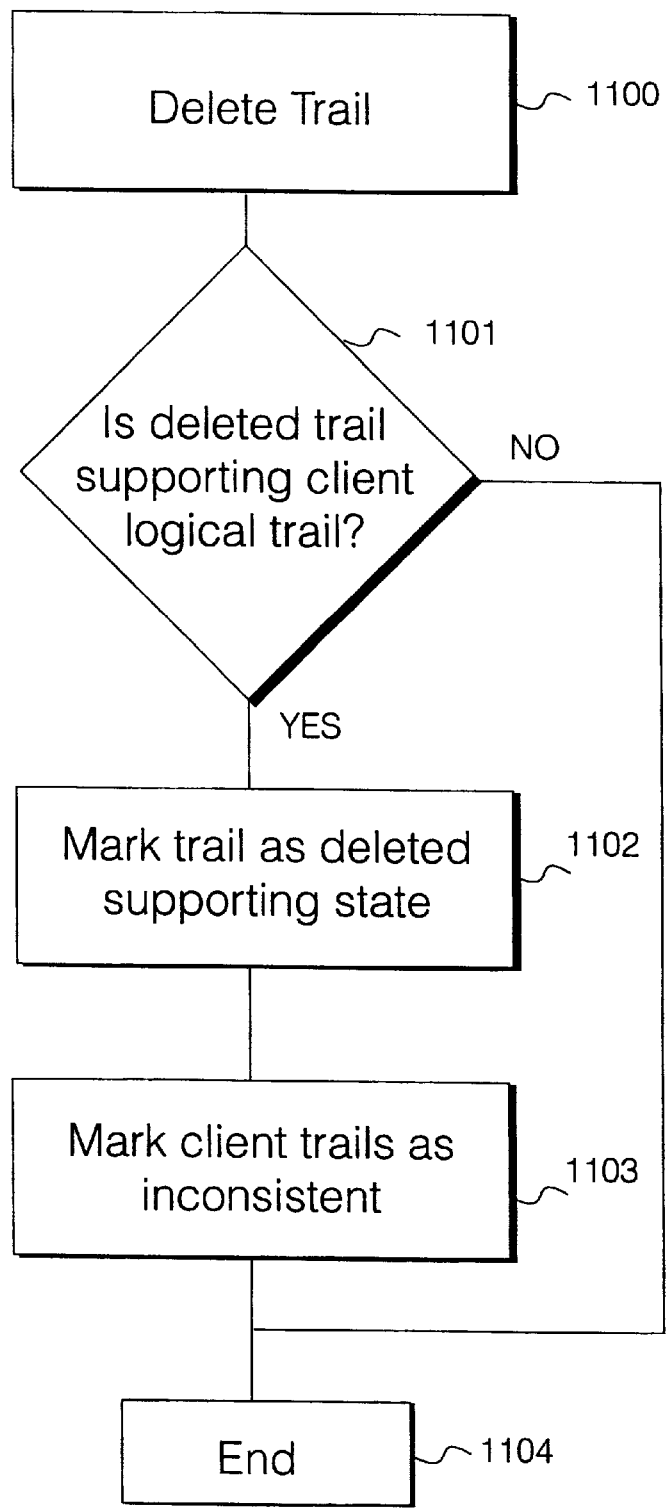
FIG. 11 illustrates schematically process steps operated by a specific implementation of the present invention during deletion of a trail in a network.

Referring to FIG. 11 herein, in step 1100, the algorithm detects that a trail has been allocated to be or is actually deleted, for example by receiving a delete trail command signal or a trail deleted signal either from the graphical user interface input by the network operator, or automatically over the OAM channel from the first node 900. In step 1101, the algorithm checks whether the deleted trail supports any logical client trails. If the deleted trail did not support any logical client trails, then no action needs to be taken, and the status of the trail object in the managed object base may remain as deleted. However, if in step 1101 it is found that the deleted trail was supporting one or more logical client trails, then in step 1102 the state of the trail in the managed object base is set to a "deleted supporting" state, denoting that the deleted trail was supporting a plurality of client trails. Client layer trails which were supported by the "deleted supporting" state trail are identified in step 1103, and the corresponding instance of the supported trail in the managed object database is updated to be set at an "inconsistent" state in step 1103. A client layer trail in an "inconsistent" state needs to be re-routed over the server layer in order to obtain support for its existence, or alternatively be supported by a new server trail to replace the deleted server trail.

Figure 12A:
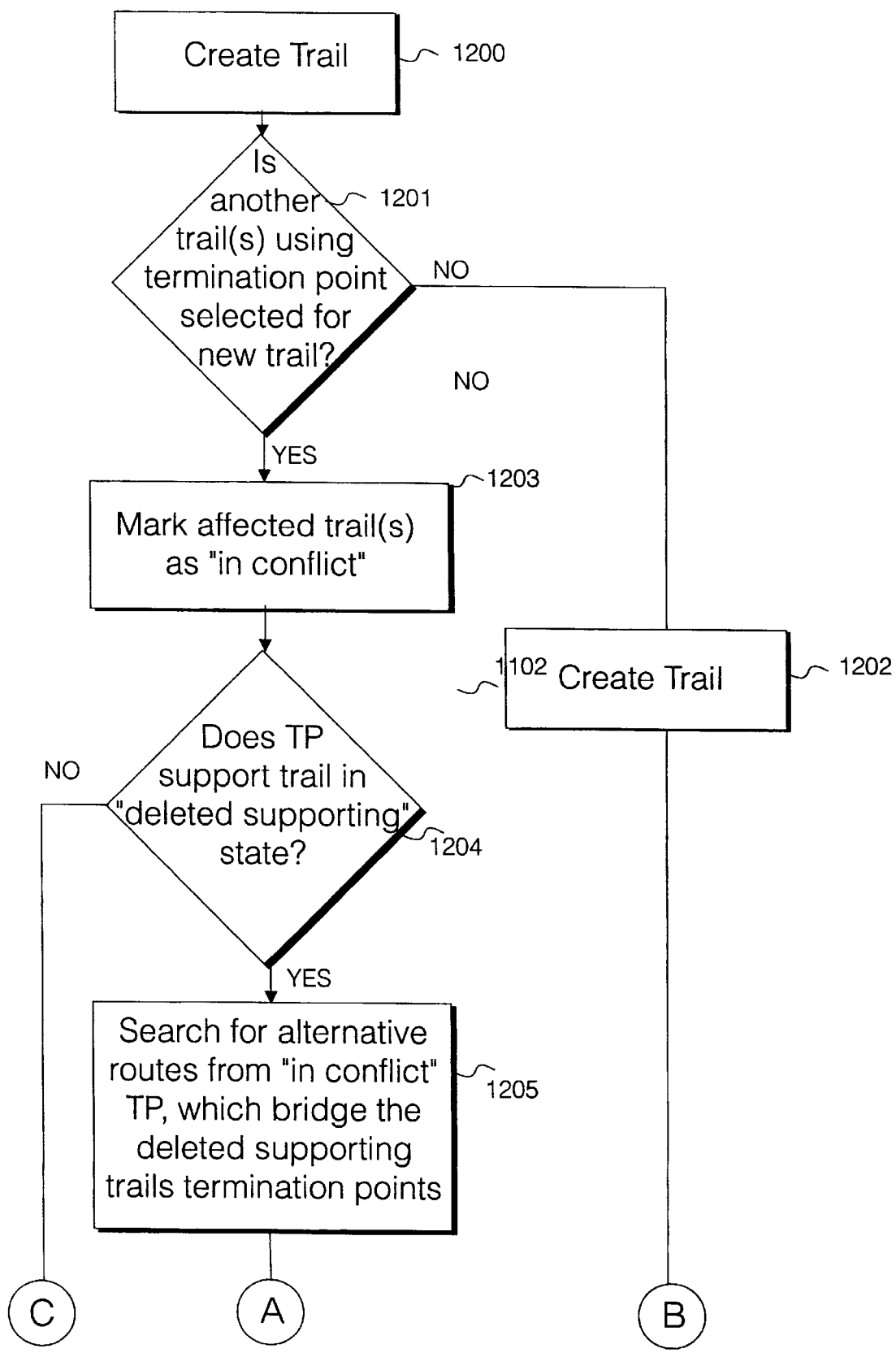
FIG. 12 illustrates schematically process steps operated by an implementation of the invention during trail creation.
Figure 12:
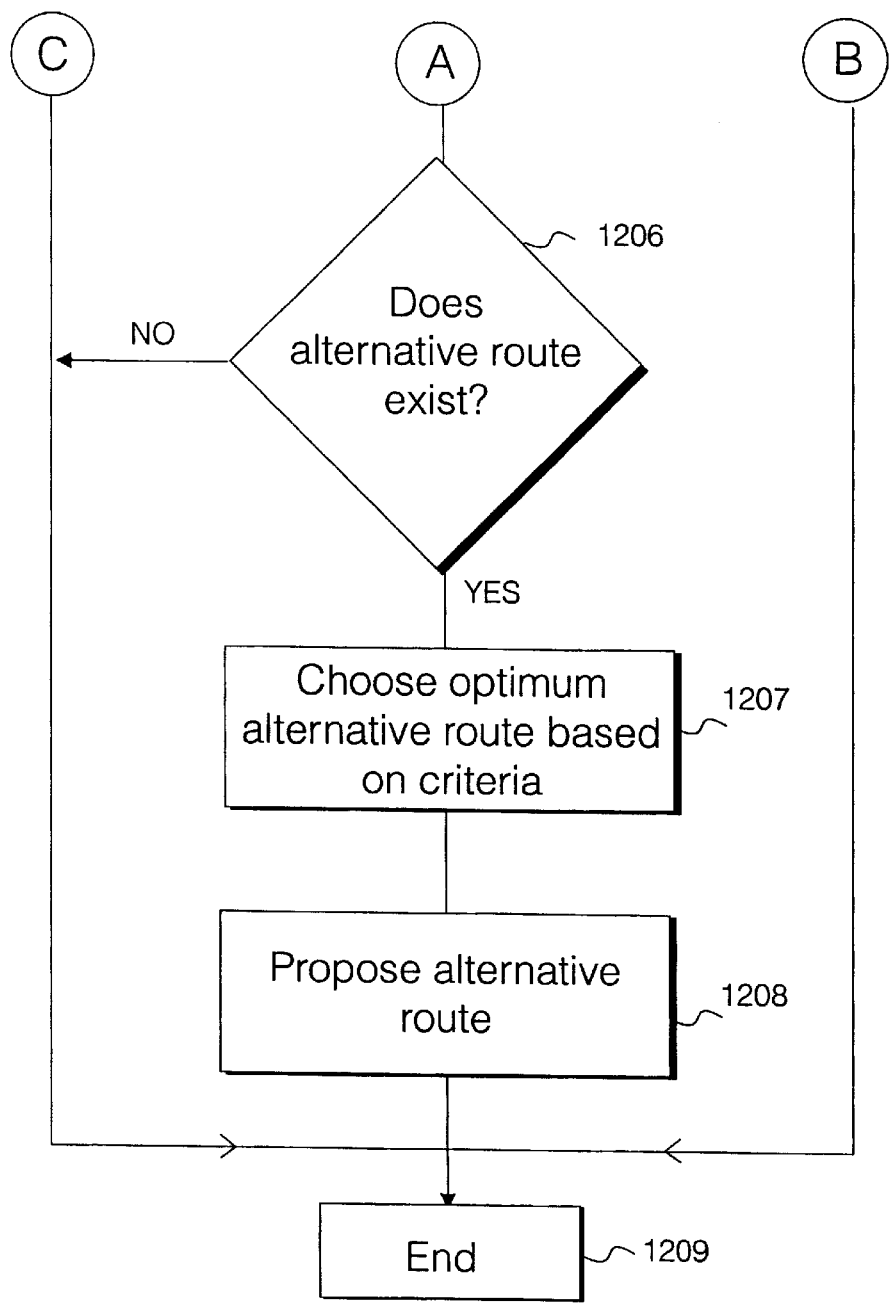

Referring again to FIG. 10 herein, and to FIG. 12 herein, on creation of link L2, a server layer trail 1000 at the physical media section layer may also be created e.g. by input of commands by a human network operator at a graphical user interface of network controller 600 by creation of a trail at a node element, in each case resulting in a create trail command signal input to the trail detection algorithm. In step 1201, a termination point of the server layer trail to be created is inspected by trail detection algorithm 608 to see if the termination point of the proposed created trail is already being used by an existing trail. This check is made by inspecting the instance of the termination point stored in the managed object base 607. If the termination point for connection of the proposed server trail is not already assigned to another trail, then the trail can be created. Step 1202 is applied to each termination point of the trail at each end of the server trail and the server trail is created only if both termination points are identified as being available for use. It is checked whether any other trails are using the termination point.

If any of the termination points allocated for the trail to be created are found to be already used by an existing trail in step 1201, in step 1203 the instances corresponding to the existing trails in the managed object database are set to an "in conflict" state. The "in conflict" state designates that a termination point of the "in conflict" trail has been re-allocated for supporting a trail to be created, ie a trail for which a create trail command signal has been received by the network controller. In step 1204, the managed object base is interrogated to see if the termination point supports a trail in a "deleted supporting" state. Interrogation is of the appropriate instances of termination points and trails. If the trail is not in the "deleted supporting" state but is in some other state, for example a "supporting" state in which the trail is not allocated for deletion (ie no command to delete the trail has been received) and is supporting one or more client trails, then the trail remains in the "in conflict" state and the existing trail remains intact in the network. If the trail is both in the "in conflict" and the "deleted supporting" states, then in step 1205 a search for an alternative route emanating from the termination point of the "in conflict" trail, which would bridge the existing trail in the "deleted supporting" state is initiated. Searching for new routes is triggered in step 1205 by the existence of a port or endpoint of an "in conflict" trail which is common with a trail in a "deleted supporting" state. Where an "in conflict" trail has two "in conflict" termination points, alternative routes are searched to replace each "in conflict" termination point. The search is performed by trail route finder algorithm 609 which incorporates a search engine. If the trail route finder algorithm 609 manages to successfully identify an alternative route over which to route the "deleted supporting" existing trail then an optimum alternative route of a plurality of routes which may have been found by the trail route finder algorithm 609 is selected in step 1207. The selected route forms a proposition for re-routing in step 1208, which the network operator, or another application may accept, and instigate actual creation of a link or trail over the alternative route proposed. If in step 1206 no alternative routes exist or no alternative routes have been found by the trail route finder algorithm 609, the termination point remains in the "in conflict" state, and no further action is taken for deletion of the "deleted supporting" trail.

Figure 13:
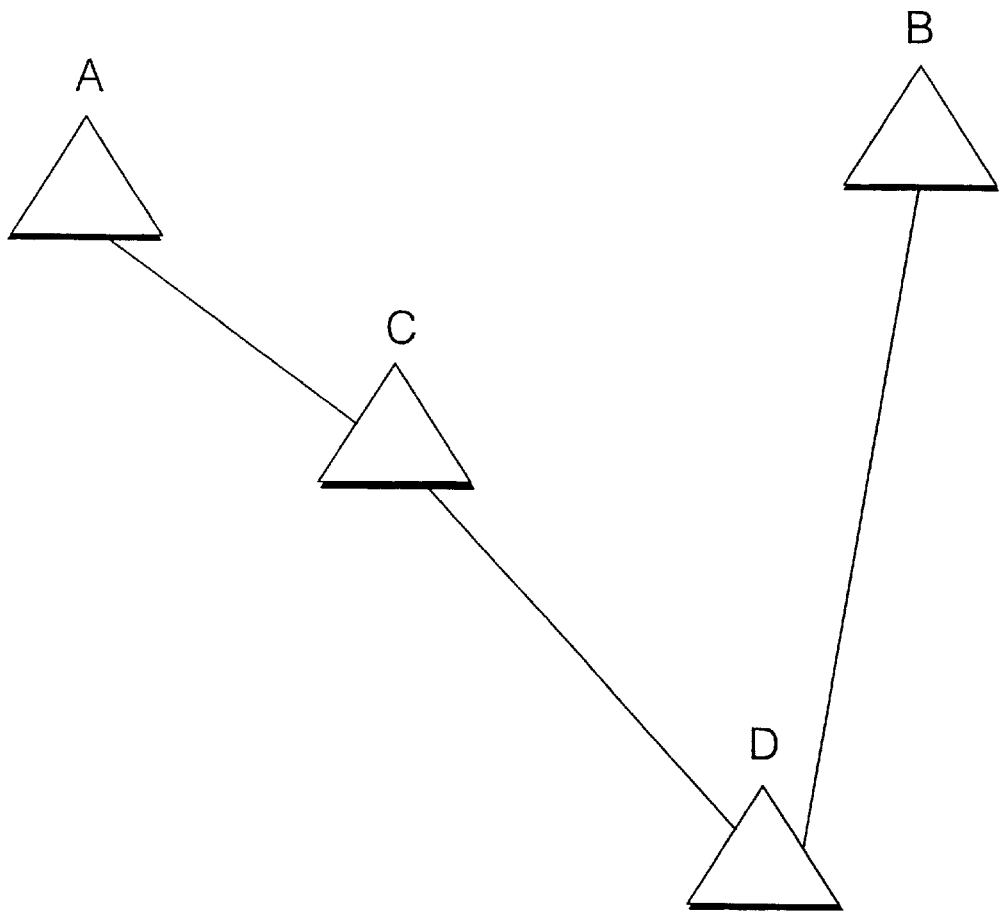
FIG. 13 illustrates schematically an example of an alternative route found in accordance with an operation performed by a specific implementation of the present invention.

Referring to FIG. 13 herein, there is illustrated a simple example of an alternative route found by trail route finder algorithm 609 between nodes A and B for replacement of the trail 904 between nodes A and B and FIG. 9. The arrangement of FIG. 13 herein may form a temporary re-routing of physical trail 904 directly between nodes A and B, pending replacement by physical trails from nodes A to C and C to B. The route illustrated in FIG. 13 is one of a plurality of alternative routes which are found by a search engine component of trail route finder algorithm 609.

Figure 14:
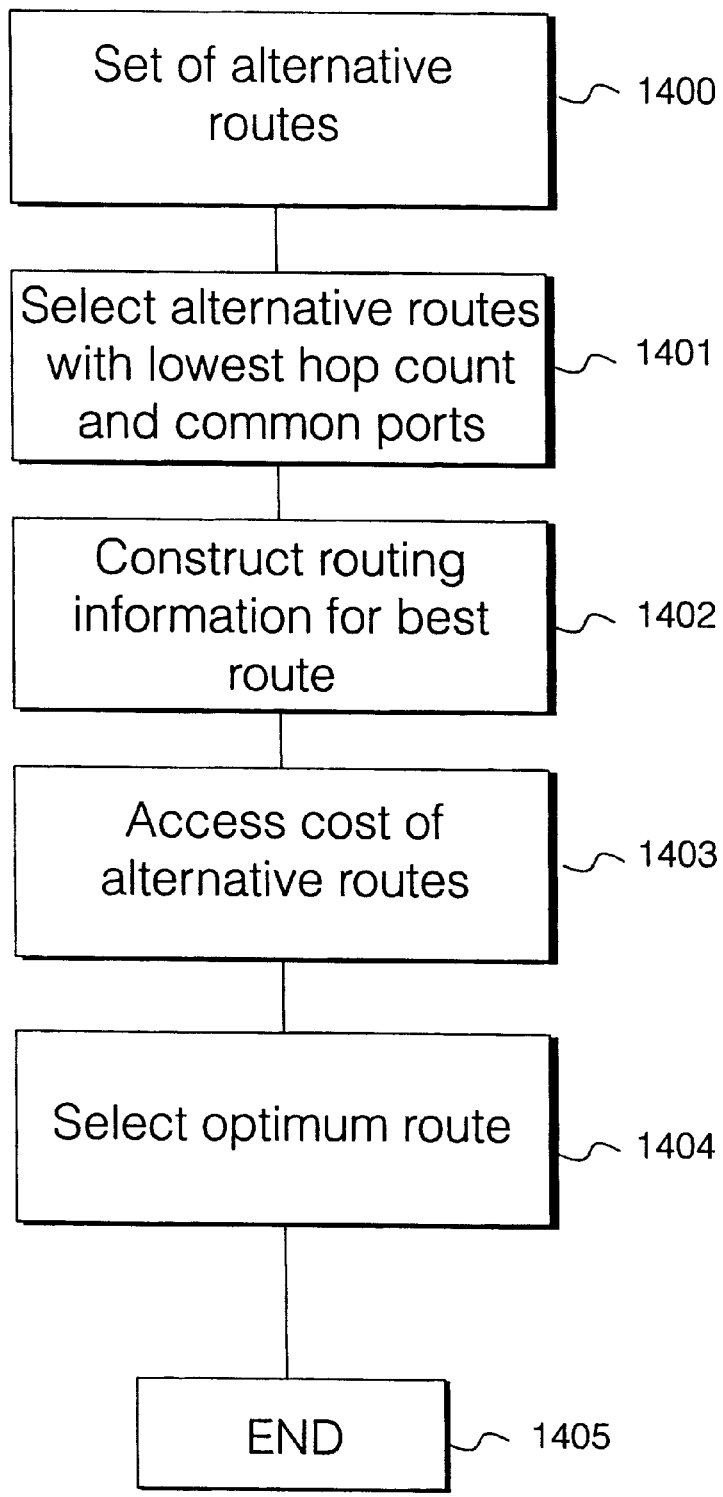
FIG. 14 illustrates schematically process steps operated by the specific implementation of the present invention.

Referring to FIG. 14 herein, steps taken by trail route finder algorithm 609 are illustrated schematically. In step 1400, a set of alternative routes between source node A and destination node B are generated by a search algorithm. Routes investigated by the search algorithm include both tributaries and aggregates. The search algorithm may comprise a search algorithm operating a search on data supplied by managed object base 607 representing each of the plurality of nodes in a network. The search engine may comprise a conventional search engine operating a search strategy based on finding a set of routes in accordance with Dijkstra's algorithm, or alternatively, a shortest route algorithm encompassing a minimum number of hops between nodes. In step 1400 alternative routes are found by the trail route finder algorithm examining a trail termination point of an "in conflict" trail and examining a set of connection rules which describe connections within a node having the trail termination point of the "in conflict" trail. The connection rules are as described in the applicant's previous US patent application U.S. Ser. No. 08/010,387 "Capability Modeling Using Templates in Network Management System". The connection rule data is used by the algorithm to determine a set of possible trails emanating from a node, which can form the basis of a new route. Inspection of the connection rule data as a constraint prevents the search algorithm from finding invalid routes which are not within the node entities' capabilities. In step 1401, routes may be selected on the basis of a most number of common ports with a previous trail's route, or on a shortest number of hops basis. The search algorithm may also assign a cost data to each node and/or link in step 1403. For example, a cost data may be assigned on the basis of delay over a link, availability of physical resources at a node, cost of maintenance of a node. In step 1404, an optimum route is selected according to a set of selection criteria. The selection criteria may include selecting a route having a shortest physical distance, selecting a route having a minimum number of nodes, selecting a route having a lowest cost (the cost being selectable from the above cost criteria). The cost of the route may be based upon a cost value assigned to each link and node. Calculation of the costs may be for example by simple summation of cost values of all nodes and links within the proposed route. Another cost criteria may comprise the availability of a link. An availability cost data may be assigned on the basis of how likely a link is to remain available, and how well protected that link is physically. For example a network operator may wish to maintain a trail having a high availability, using only routes which are reliable and not prone to fault. In this case, the availability cost criteria would be selected as the basis for selection of an optimum alternative route. Individual links of the route would be selected on the basis of their high link availability criteria. An output of the trail route finder algorithm 609 comprises a list of link termination points and node entities comprising a found route. Where a set of possible routes are found by the algorithm, each route is defined in terms of a plurality of link termination points, and node entities supporting those link termination points. The list of link termination points and node entities are equivalent to instances of link termination points and instances of node entities in the managed object base of FIG. 7.

Figure 15:
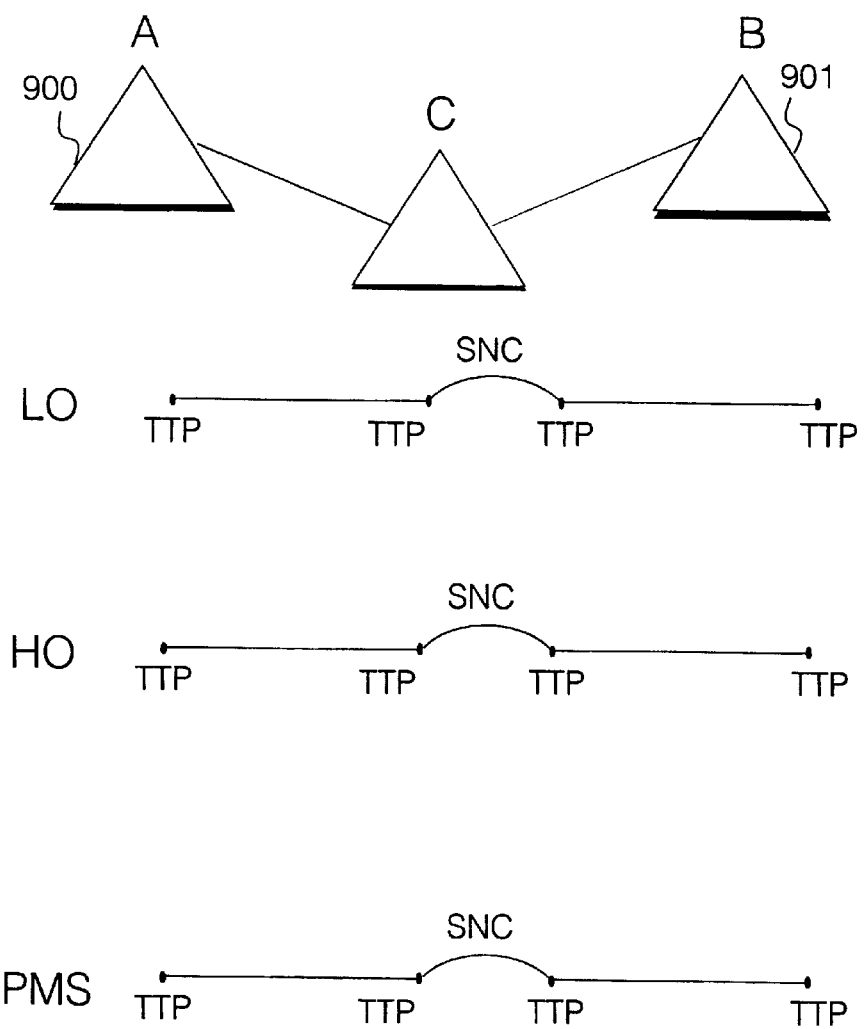
FIG. 15 illustrates schematically a completed reconfiguration of the network by provisioning of the additional transmission entity.

The route of FIG. 13 herein may be implemented by creation of new trails and links between nodes A, C, D and B as an intermediate step prior to full configuration of new node C as illustrated in FIG. 15 herein. Each of links A-C, C-D, D-B require provisioning of links and trails as in step 1202 herein before described.

Referring to FIG. 15 herein, there is illustrated schematically a finalised reconfigured trail between nodes A, C and B to replace the deleted trail between nodes A and B. The server trail at the physical media section, optical section, regenerator section and multiplex section is illustrated schematically as a single server trail in FIG. 15 for ease of description. A higher-order layer client trail and a lower-order layer client trail are also illustrated which are dependant upon the server trail for their existence. The managed object database is updated, upon creation of the physical trail A-C-B. The original physical trail A-B which was previously in the "deleted supporting" state is deleted, and replaced by newly created connections A-C, C-B, which are linked by a sub network connection within node C to each of the layers.

What is claimed is:

1. In a communications network comprising a plurality of resources arranged in a plurality of layers wherein resources at a client layer are dependent upon resources at a server layer, the network including means for maintaining an object database describing a plurality of resources of said communications network, said object database comprising a plurality of instances representing physical and logical resources, the network further including means for modifying individual ones of said plurality of instances when a said resource is re-configured by setting a state of a said instance, a method of determining an alternative network connectivity for a client layer resource of said network affected by a network topology change at a server layer of said communications network, said method comprising the steps of:

determining if the client layer resource is affected by a network topology change affecting a server layer resource; and in the event that said client layer resource is affected by said change, determining an alternative network connectivity for said at least one client layer resource affected by said change.

2. The method as claimed in claim 1, wherein said plurality of instances include instances selected from the set:

an instance representing a node entity;

an instance representing an endpoint;

an instance representing a trail;

an instance representing a trail termination point;

an instance representing a connection;

an instance representing a connection termination point;

an instance representing a link connection;

an instance representing a port;

an instance representing a sub network connection;

an instance representing a link;

an instance representing a link termination point.

3. The method as claimed in claim 1, wherein a one of said plurality of instances represents a trail, the method further comprising the step of receiving a signal for deletion of said trail, wherein in response to said received signal, said object database is interrogated to determine whether said trail subject of said delete signal supports a client trail.

4. The method as claimed in claim 1, wherein a one of said plurality of instances represents a trail, the method further comprising the steps of:

receiving a signal for deletion of said trail;

on receipt of said delete signal determining whether said trail subject of said signal is supporting a client trail; and if said trail subject of said delete signal is supporting a client trail, setting said state of said trail to a data signify said trail is supporting at least one client trail by setting a data in said object database.

5. The method as claimed in claim 4, further comprising the step of setting data describing a said client trail to a state signifying deletion of said trail is inconsistent with supporting said client trail.

6. A method as claimed in claim 1, further comprising reconfiguring said server layer resource by setting a said state of a said instance of said server layer resource to indicate said change has said effect on said client layer resource.

7. A method as claimed in claim 1, further comprising reconfiguring said server layer resource by setting a said state of a said instance of said server layer resource to indicate said change has said effect on said client layer resource, and reconfiguring said client layer resource by setting a said state of a said instance of said client layer resource to indicate said change has said effect on said client layer resource.

8. A method as claimed in claim 1, further comprising the steps of reconfiguring said client layer resource by setting a state of a said instance of said client layer resource to indicate said alternative network connectivity.

9. A method as claimed in claim 1, wherein said alternative network connectivity includes at least one server layer resource differing from the server layer resource initially affected by the change to the network connectivity.

10. A method of managing a communications network comprising a plurality of network resources, said method comprising the steps of:

representing each of a plurality of said network resources by managed object data in a managed object database;

inputting signals describing deletion of a said resource at a server layer;

interrogating said set of managed object data to find a set of client resources dependant on said server resource, and setting a managed object data for said resource at said server layer to indicate said server layer resource supports said set of client resources, characterised in that the method further includes the steps of:

determining if at least one alternative server layer resource is able to support said set of client resources.

11. The method as claimed in claim 10 wherein said managed object data describing said resources comprises connection rule data describing a plurality of rules for connecting said plurality of resources.

12. The method as claimed in claim 10, wherein said plurality of network resources include resources selected from the set:

transmission entities;
physical resources;
logical resources.

13. The method as claimed in claim 10, wherein said managed object data describes at least one element selected from the following set:

trail termination point;
connection termination point;
connection;
link;
link connection;
physical port;
logical port;
sub network connection;
server trail;
client trail;
server link;
client link.

14. A method as claimed in claim 10, further comprising the step of setting managed object data for said client resources to indicate that alternative server layer resources are able to support said set of client resources.

15. A method as claimed in claim 10, further comprising the steps of:

setting managed object data for said client resources to indicate that alternative server layer resources are able to support said set of client resources; and setting a managed object data for said resource at said server layer to indicate said server layer resource is an alternative source of support for said set of client resources.

16. A network management apparatus for a communications system comprising a plurality of nodes, said network management apparatus comprising:

at least one data processor;

at least one data storage means;

wherein said processor and said data storage means are configured as a managed object database comprising a plurality of managed object data representing a plurality of resources of said communications network; and a said processor operates in accordance with an algorithm to detect a topology change to a configuration of said plurality of resources, wherein said managed object data includes data describing if at least one alternative resource in a server layer of said communications system is able to support a resource in a client layer of said communications system affected by said change.

17. The apparatus as claimed in claim 16, wherein a said processor operates in accordance with an algorithm to find a plurality of routes across said network in response to a detected change of configuration of said plurality of resources.

18. The apparatus as claimed in claim 16, wherein a said processor operating in accordance with said detection algorithm operates to read a plurality of states of said managed objects of said managed object database.

19. The apparatus as claimed in claim 16, wherein a said topology change comprises a physical topology change.

20. The apparatus as claimed in claim 16, wherein a said topology change comprises a logical topology change.

21. The apparatus as claimed in claim 16, wherein a plurality of topological changes are made at the server layer of said network, the managed object data further comprising data determining which of a set of client layer trails are affected.

22. In a layered synchronous network comprising a plurality of resources arranged in a plurality of layers, wherein resources at a first layer of the layered synchronous network are dependent on resources at another layer of the layered synchronous network, and wherein a trail in said first layer of the network is supported by a route in a physical layer of said layered synchronous network, wherein a topological change to the physical layer affects the route such that the trail becomes unsupported, a computerised method of re-routing a client trail supported by a server trail comprising the steps of:

detecting the effect of said topological change to the physical network on the client trail;

determining if a second route can be implemented to support said client trail;

determining if a characteristic of said client trail requires modification to implement said second route.

23. A method as claimed in claim 22, wherein said characteristic is an adaptation rule for said trail.

24. A method as claimed in claim 22, wherein said topological change is the disconnection of a physical link in the network.

25. A method as claimed in claim 22, wherein said first layer is a logical layer.

26. A method as claimed in claim 22, wherein said first layer is a logical layer taken from the group consisting of:

the optical section layer; the regenerator section layer; the multiplex section layer; higher order layer; and lower order layer.

27. A method as claimed in claim 22, wherein said step of determining if a characteristic of said client trail requires modification to implement said second route comprises:

identifying data describing at least one endpoint of said client trail;

determining from said endpoint data whether said client trail requires modification.

28. A method as claimed in claim 27, wherein said step of detecting the effect of said topological change to the physical network on the client trail further comprises determining if said server trail is in a state suitable for deletion.

29. A method as claimed in claim 27, wherein said step of determining if a second route can be implemented to support said client trail comprises:

assigning a cost data to each of a plurality of network resources; and determining an optimum route on the basis of said cost data.

30. A method as claimed in claim 29, wherein a said cost data is assigned on the basis of an availability of a said network resource.

31. A method as claimed in claim 29, wherein a said cost data is assigned on the basis of a least number of hops between node entities.

* * * * *